United States Patent [19]
Han

[11] Patent Number: 5,220,430
[45] Date of Patent: Jun. 15, 1993

[54] SOUND CONTROL SIGNAL DETECTING CIRCUIT FOR SATELLITE BROADCASTING SIGNALS

[75] Inventor: Hong Soo Han, Suweon, Rep. of Korea

[73] Assignee: SamSung Electronics Co., Ltd., Suwon, Rep. of Korea

[21] Appl. No.: 744,931

[22] Filed: Aug. 14, 1991

[30] Foreign Application Priority Data

Nov. 7, 1990 [KR] Rep. of Korea .................. 90-17985

[51] Int. Cl.⁵ .............................................. H04N 7/20
[52] U.S. Cl. ................................................ 358/198
[58] Field of Search ...................... 358/198; 381/2, 77, 381/80

[56] References Cited
U.S. PATENT DOCUMENTS 4,691,236 9/1987 Kanno et al. ................... 358/198 X Primary Examiner—James J. Groody
Assistant Examiner—Mark R. Powell
Attorney, Agent, or Firm—Robert E. Bushnell

[57] ABSTRACT

A sound control signal detecting circuit for a satellite broadcasting signals comprises a detecting portion for detecting control bits by carrying out shiftings for a predetermined number of times after the pulse code modulation sound signals are provided and a majority logic deciding portion for providing A/B mode signals, first and second TV sound signals, and first and second extra sound signals after verifying whether a certain state of relevant bits is maintained over a predetermined number of times in a plurality of frames so that a precise decoding operation can be accomplished. The detecting portion comprises a first shift register, a second shift register, and a first control signal generating section. The majority logic deciding portion comprises a period converting section, a state judging section, a second control signal generating section and a latch section.

20 Claims, 7 Drawing Sheets

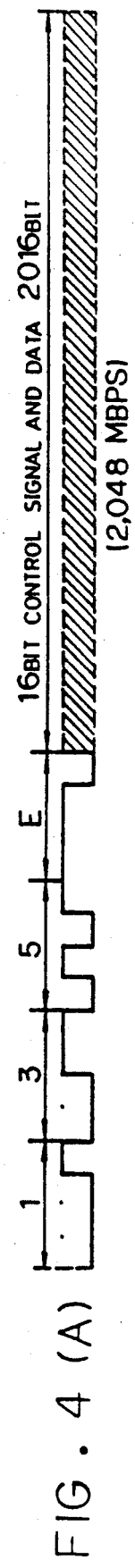
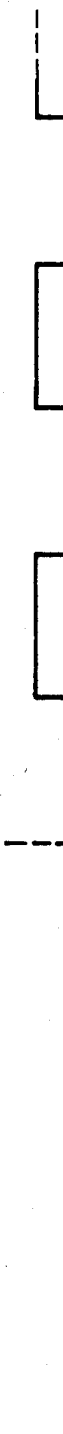
FIG. 4 (A)
FIG. 4 (B)
FIG. 4 (C)
FIG. 4 (D)
FIG. 4 (E)

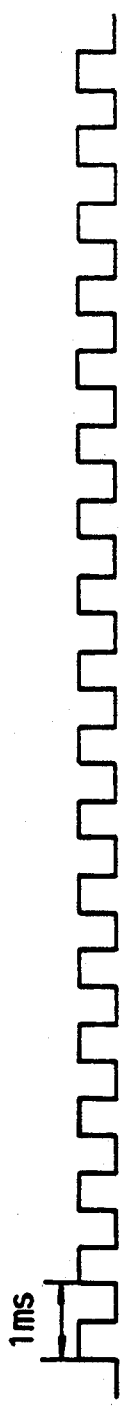
FIG. 6 (A)
FIG. 6 (B)
FIG. 6 (C)
FIG. 6 (D)
FIG. 6 (E)
FIG. 6 (F)

SOUND CONTROL SIGNAL DETECTING CIRCUIT FOR SATELLITE BROADCASTING SIGNALS

FIELD OF THE INVENTION

The present invention relates to a pulse code modulation (hereinafter, referred to "PCM") decoder for a satellite broadcasting receiver, and more particularly to, a sound control signal detecting circuit for satellite broadcasting signals, in which sound control signals are detected and a majority logic decision is made on a plurality of frames of the detected signals so that an exact mode can be read.

BACKGROUND OF THE INVENTION

Generally, PCM sound signals received via a satellite exits in the unit of frame and in a period of 1 msec., as shown in FIG. 1(A). Each frame of such PCM sound signals consists of 2048 bits, where previous 16 bits are synchronizing signals of "135E" Hex, and next 16 bits are control bits for controlling the decoding of sound data, while the remaining 2016 bits are range bits such as a plurality of sound bits, extra data, error correcting codes and the like.

A first bit of the above mentioned control bits indicates in A or B mode depending on whether its corresponding bit is 1 or 0. In the case of the A mode, 4-channel data having 32 KHz sampling frequency fs is decoded and an operation for expanding bits from 10 to 14 is carried out. On the other hand, in the case of the B mode, 2-channel data having 48 KHz sampling frequency fs is decoded and an operation for protecting an upper bits is carried out. Therefore, the reading of the A or B mode has to be precisely carried out for the control bits.

Second and third bits represent sound modes in a television indicating a whether a received sound mode is expressed in mode stereo mono a mode, a native language mode or a foreign language mode and the like as shown in table 1.

TABLE 1

|   | 0 | 1 |
|---|---|---|
| 0 | Stereo | Mono |
| 1 | Native/foreign | Non-definition |

Fourth and fifth bits represent an extra sound mode and also indicate a whether a received sound mode is expressed in mode stereo or a mono, mode a native language mode or a foreign language mode and independence as shown in table 2.

TABLE 2

|   | 0 | 1 |
|---|---|---|
| 0 | Stereo | Mono |
| 1 | Native/foreign | Non-definition |

Then, Sixth to fifteenth bits are not specifically defined, and a sixteenth bit indicates as to whether received sound data is to be muted at an end or not. Muting is carried out when the sixteenth indicates a logic state of bit "1".

It is well known that the sound data can be correctly decoded only when the control bits of the above described are correctly detected. However, the conventional PCM decoder which is constructed as shown in FIG. 2 can detect only the control bits simply in the unit of a frame. If a synchronizing signal indicating the start of one frame is detected by a synchronizing signal detecting section 7a after receipt of the PCM sound signals, a descrambler 7c controlled by a clock generator 7b disperses the format of the input PCM sound signals.

The dispersed data is supplied to a deinterleaving section 7h, where error dispersing operation is carried out for preventing simultaneous occurrence of errors. The deinterleaved signals are subjected to BCH (BASE-Chandhuri-Hocquenghem) codings by a certain sample block in a BCH correcting section 7i so that a single error is corrected and double errors remains uncorrected. The BCH-coded signals are supplied to a range bit extending section 7j, where condensed bits (condensed when transmitting) are extended.

An interpolating section 7k receives the extender range bit and the double errors found during the BCH coding to carry out a proper interpolating operation, and thereafter, the resultant data is supplied to an output selecting section 7l. The output selecting section 7l carries out the 32 or 48 KHz sampling depending on the selected mode of either A or B mode.

Meanwhile, the detection of the control bits has to be preceded to control the output selecting section 7l. Therefore, the control bit detecting section 7d detects the control bits in the unit of a frame among the PCM sound signals which are dispersed by the descrambler 7c. Then, the detected result is supplied to the output selecting section 7l and simultaneously supplied to a display control section so that the detected result of the control bits can be displayed on a front panel displayer (not shown).

However, the control bit reading method described above has the problem that the error occurrences in the control bits of the received sound signals could not be precisely detected.

SUMMARY OF THE INVENTION

The present invention is intended to improve the above described disadvantage of the conventional technique.

Therefore, it is an object of the present invention to provide a sound control signal detecting circuit for a satellite broadcasting signal, in which the control signal can be precisely detected during a PCM decoding operation in a satellite broadcasting receiver by successively inputting the descrambled PCM sound signals in a certain period, by detecting the control bits after shifting several times, by inspecting the certain bit states for the period and for every bit of the control bits, and by outputting the relevant bits upon finding a satisfactory state after several rounds of inspections.

In order to achieve the above object, there is provided a sound control signal detecting circuit for satellite broadcasting signals in a satellite broadcasting receiver having a PCM decoder circuit, wherein said circuit comprising: detecting means for detecting control bits by shifting PCM sound signals VS for certain times after receiving the PCM sound signals over a certain period; and majority logic deciding means for outputting respective A/B mode signals, first and second TV sound signals, and first and second extra sound signals of the relevant bits if a certain state is satisfied for the certain times or more after inspecting the relevant bit states of each first to fifth and sixteenth bits of said control bits over a certain period.

BRIEF DESCRIPTION OF THE DRAWINGS

The above object and other advantages of the present invention will become more apparent from the detailed description of the preferred embodiment of the present invention with reference to the attached drawings, in which:

FIG. 4 to FIG. 6 are views showing wave patterns for the operation according to the present invention.

DESCRIPTION OF THE PREFERRED EMBODIMENT

Figure 1:
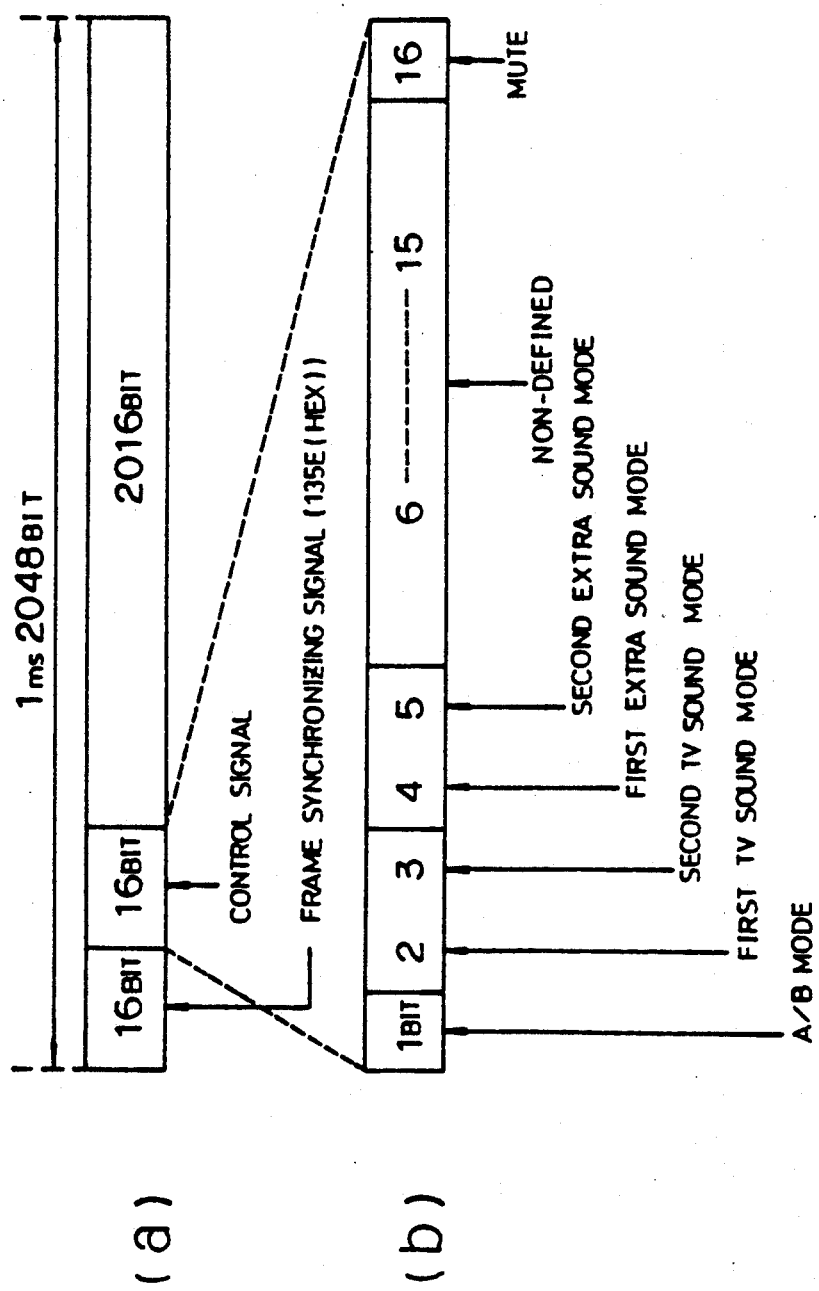
FIG. 1 is a view showing a conventional PCM sound signal format.
Figure 2:
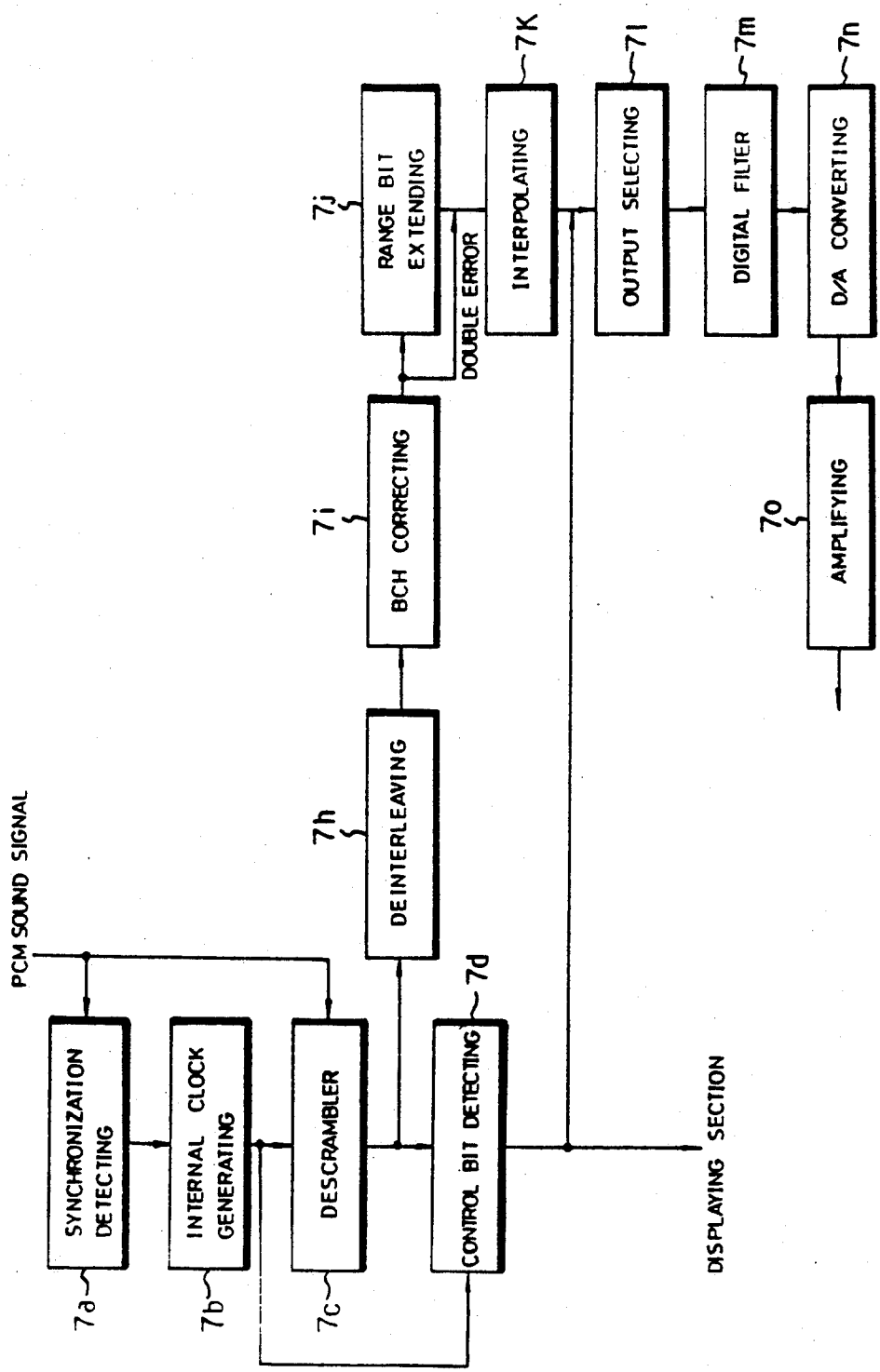
FIG. 2 is a block diagram showing the constitution of a conventional PCM decoding circuit.
Figure 3:
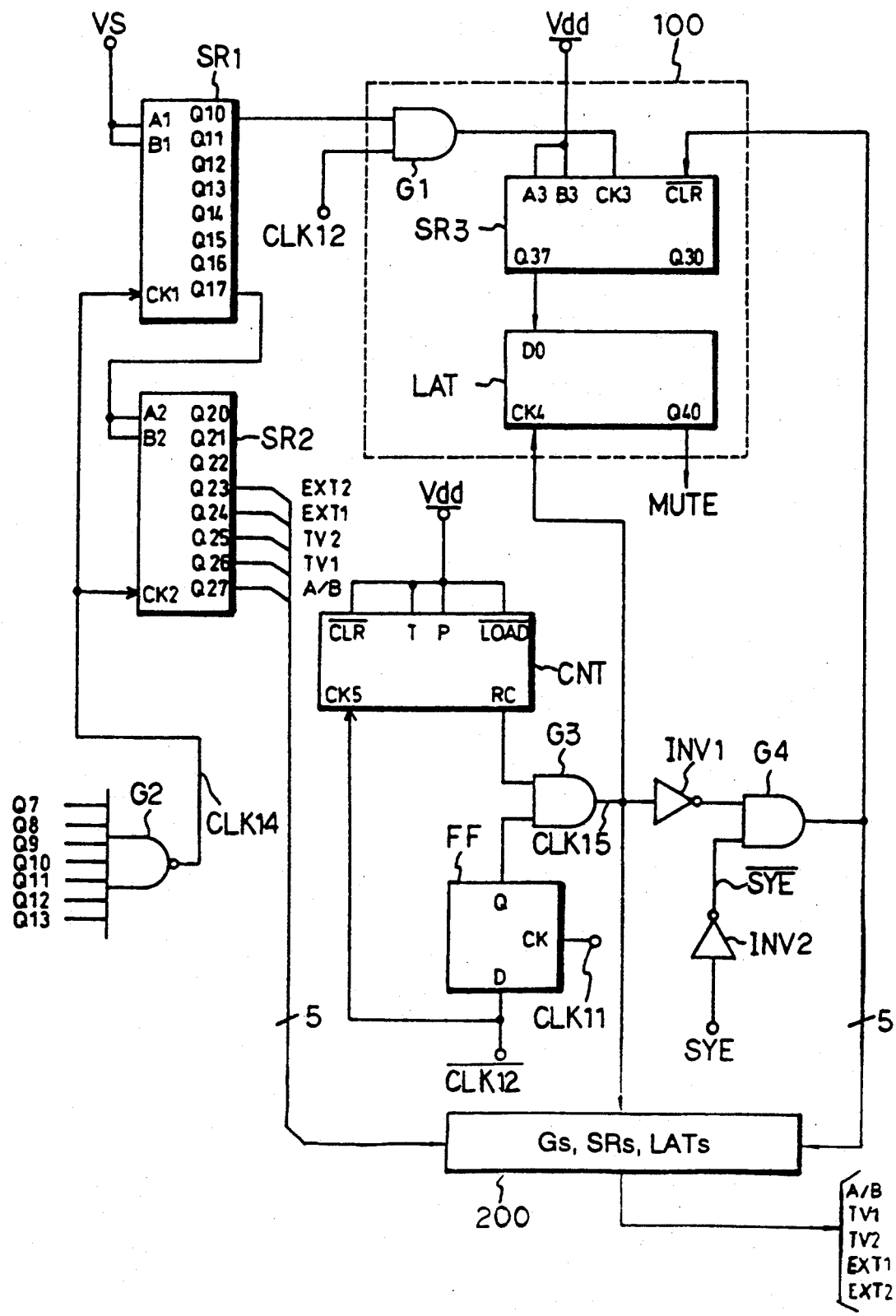
FIG. 3 is a block diagram showing the sound control signal detecting circuit for satellite broadcasting signals according to the present invention.

FIG. 3 is a block diagram showing the constitution of a sound control signal detecting circuit according to the present invention. In FIG. 3, the sound control signal detecting circuit comprises a first shift register SR1 for inputting and shifting PCM sound signals VS sequentially in synchronization with predetermined clock signals, a second shift register SR2 for inputting and shifting last shifted output signals of the first shift register SR1 sequentially in synchronization with predetermined clock signals, a NAND gate G2 for controlling the two shift registers SR1, SR2 by generating a fourteenth clock signal CLK14 which was detected by previous 32 bits from one frame after logically combining a plurality of clock signals having different periods, an AND-gate G1 for forming one frame period after logically combining a twelfth clock signal with signals outputted from a first output terminal Q10 of the first shift register SR1, a third shift register SR3 for checking as to whether the same position bits of a plurality of frames show a constant state over certain times by carrying out successive shifts in synchronization with the output signals of the AND-gate G1 after inputting a power source voltage Vdd, a counter CNT for generating a ripple carry output for every 16 frames in synchronization with an inverted clock signal $\overline{CLK12}$ of the twelfth clock signal, a D flip-flop FF for generating an output from the inverted clock signal $\overline{CLK12}$ of the twelfth clock signal in synchronization with an eleventh clock signal CLK11 after shifting by ¼ frame, and AND-gate G3 for logically combining the outputs of the counter CNT with that of the D flip-flop FF, a first inverter INV1 for inverting the output of the AND-gate G3, a second inverter INV2 for inverting synchronizing error signals SYE, an AND gate G4 for clearing the third shift register SR3 on generating normal synchronizing signals after logically combining the outputs of the first and second inverters INV1, INV2, and a block 200 for generating A/B mode signals, first and second TV sound signals TV1, TV2, and first and second extra sound signals EXT1, EXT2 on receiving a fifteenth clock signal CLK15 and the output signals of the AND gate G4, after detecting the first to the fifth bits of the control bits outputted from fourth to seventh output terminals Q23-Q27 of the second shift register SR2.

The block 200 comprises AND-gates, shift registers and latches, and provides its output after making a majority logic decision, similar to as the case of the sixteenth bit of the control bits outputted through a first output terminal Q17 of the first shift register SR1.

Figure 7:
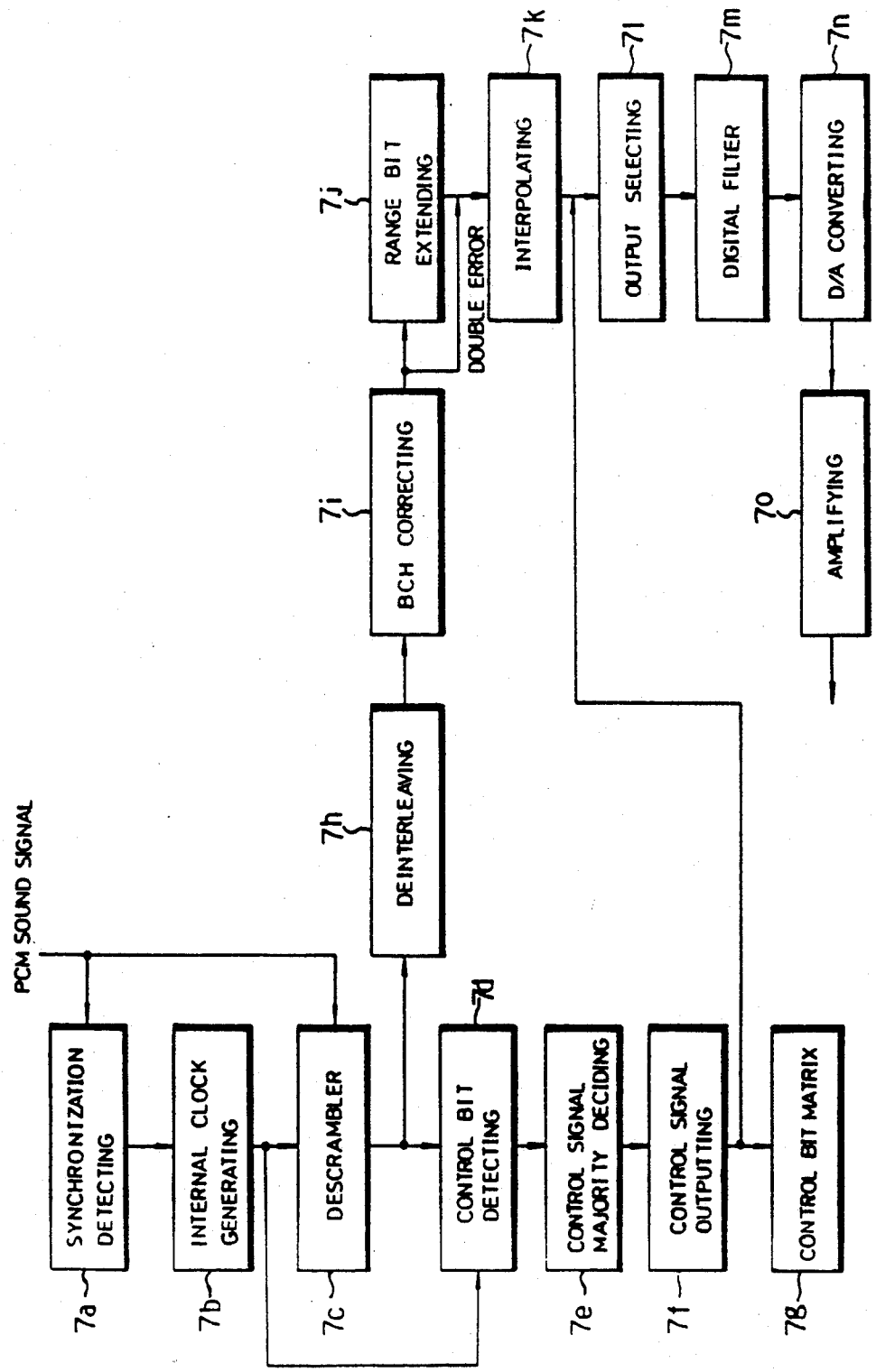
FIG. 7 is a block diagram showing the constitution of a PCM decoding circuit according to the present invention.

FIG. 7 is a block diagram showing the constitution of a PCM decoder adopted by the present invention, and this circuit further includes a control signal majority logic deciding section 7e and a control signal output section 7f disposed between the descrambler 7c and the output selecting section 7l.

Now the present invention constituted as above will be described in more detail.

As shown in FIG. 7, the PCM sound signals are inputted into both of the synchronization detecting section 7a and the descrambler 7c. As shown in FIG. 4(A), as soon as the synchronizing signals of "135E" of the previous 16 bits of one frame is input, the synchronization detecting section 7a detects and generates a synchronizing signal as shown in FIG. 4(B). The synchronizing signal is input into the internal clock generator 7b as a clear pulse.

When the clear pulse is received by the internal clock generator 7b, the internal clock generator 7b divides the frequency generated by an external quartz oscillator, thereby generating first to twelfth clock signals CLK1-CLK12. The first clock signal CLK1 has a frequency of 2.048 MHz. The second clock signal CLK12 is formed by dividing the first clock signal CLK1 into two halves having a frequency of 1.024 MHz each, and the remaining third to twelfth signals CLK3~CLK12 is formed in a similarity successive fashion to obtain frequencies of 512, 256, 128, 64, 32, 16, 8, 4, 2 and 1 KHz, sequentially.

Meanwhile, the PCM sound signals which are input into the descrambler 7c are descrambled through proper processes by the above clock frequencies.

The descrambled signals are input into the control bit detecting section 7d for detecting the control bits, and the states of the control bits are checked by the majority logic deciding section 7e. The majority logic deciding section 7e judges as to whether at least 8 bits among the same position bits of the respective 16 frames hold a certain state, i.e., "1".

The control signals which have undergone the majority logic deciding process are supplied to the control signal output section 7f, and the control signal output section 7f in turn properly processes the received control signals. Then, the processed signals are supplied to both of the output selecting section 7l and a control bit matrix section 7G which consists of LCDs and which is able to display the mode selection state.

As described above, in order to overcome the difference of the restoring time band by resorting to the difference of the sampling time for different modes, the output selecting section 7l controls the extension of the time axis, and this operation is also controlled by control signals supplied by the control signal output section 7f. Therefore, it is apparent that a precise detection of the control signals has to be preceded by the controlling of the time axis extension operation.

Now referring to FIG. 3, the mute signal detection and the majority logic deciding operation will be described in more detail with reference to some examples of the control bits.

The PCM sound signals VS provided from the descrambler 7c are delivered to two input terminals A1,B1 of the first shift register SR1. The first shift register SR1 is an 8-bit shift register, and performs successive shiftings in the PCM sound signals in synchronization with the fourteenth clock signal CLK14.

Figure 5:
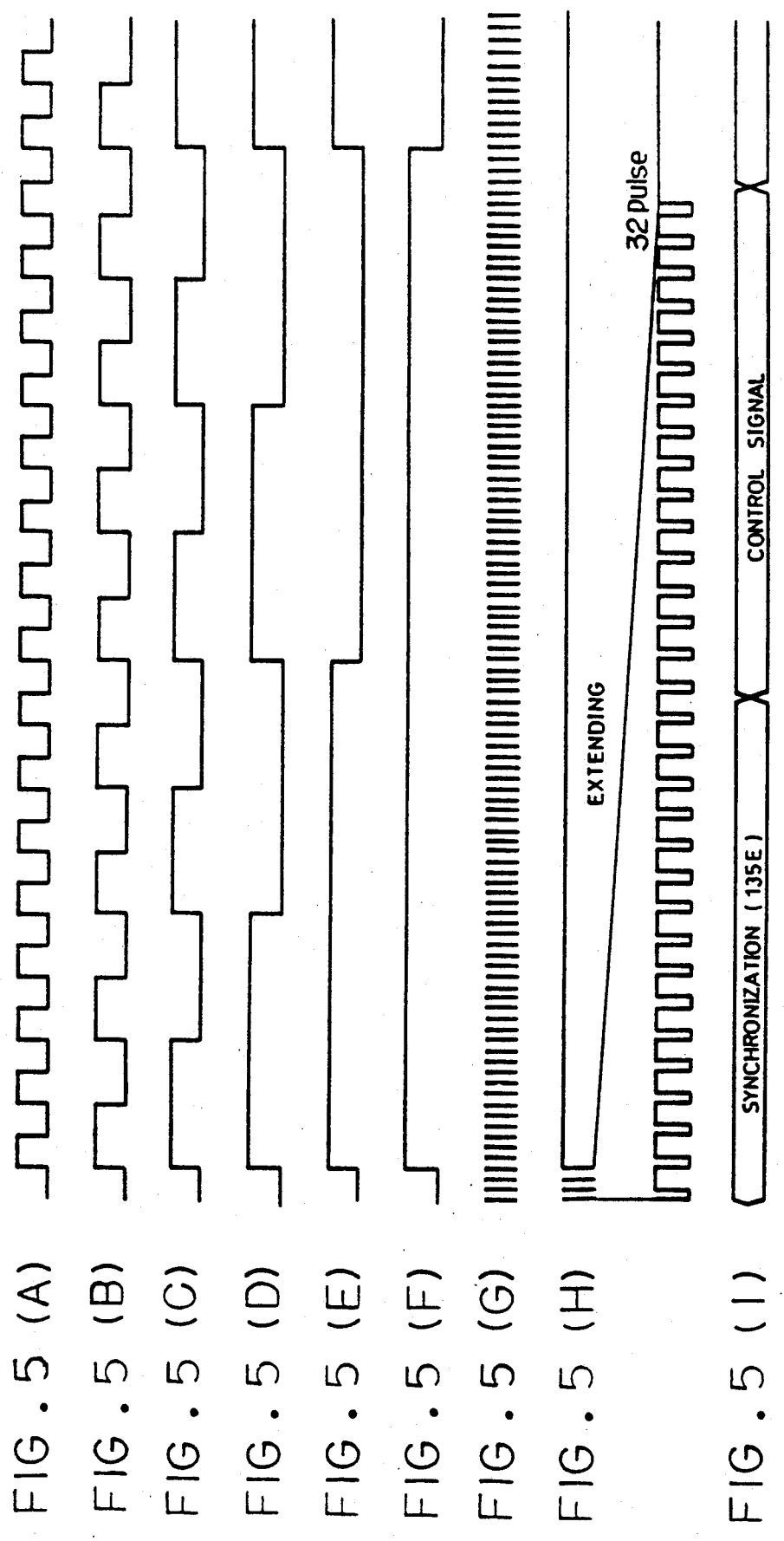

The fourteenth clock signal CLK14 is generated from the NAND gate G2, and this signal is obtained as the result of carrying out inverse logic multiplications on the inverted clock signals CLK7-CLK13 of the seventh to thirteenth clock signals as shown in FIGS. 5(A)-5(G) and the wave pattern of the fourteenth clock signal is as shown in FIG. 5(H).

Therefore, the time point, at which a thirty second bit is input after the first bit of one frame is input in synchronization with the first clock of the fourteenth clock signal CLK14 and after the successive bits are shifted by the successive clocks, corresponds to the time point at which the last bit of the control bits is received after the input of the frame synchronizing signal is completed. That is, when the last thirty second clock is input, each of first to eighth outputs Q10-Q17, Q20-Q27 of the respective first and second shift registers SR1,SR2 is generated after all the 16 bits of the control bits are output.

The sixteenth bit of the control bits, which is provided from the first output terminal Q10 of the first shift register SR1, is applied to an input terminal of the AND gate G1, where the clock is logically combined with a twelfth clock signal CLK12 provided from another input terminal.

If the control bit is "1", the AND gate G1 outputs "1", and if it is "0", the AND gate G1 outputs "0", while the output signal is applied to a clock signal input terminal CK3 of the third shift register SR3.

Consequently, each time the clock signal input terminal CK3 has a state of "1", the third shift register SR3 performs a shifting operation by inputting the power source voltage Vdd through two input terminals A3,B3. On the other hand, when a control bit "0" is input into the clock signal input terminal CK3, "0" is output without being accompanied by the shifting operation of the output signal.

Meanwhile, in synchronization with the fifteenth clock signal CLK15 which is generated through a process to be described below, a latch LAT latches the signals provided from the eighth output terminal Q37 of the third shift register SR3, and generates a muting signal through an output terminal Q40.

First, the process of generating the fifteenth clock signal CLK15 will be described. In synchronization with the inverted signal CLK12 of the twelfth clock signal as shown in FIG. 6(A), the counter CNT outputs "1" over a period of one frame for every 16 frames through a ripple carry output terminal RC as shown in FIG. 6(B). The D flip-flop FF receives the inverted signal CLK12 of the twelfth clock signal and synchronizes it to the eleventh clock signal CLK11 as shown in FIG. 6(C), so that the signal should be shifted by $\frac{1}{4}$ frame, thereby generating an output signal as shown in FIG. 6(D).

The output signal provided from the counter CNT and the D flip-flop FF are logic-combined by the AND gate G3, and consequently, the fifteenth clock CLK15 as shown in FIG. 6(E) is generated. The fifteenth clock signal CLK15 is inverted by a first inverter INV1, and an AND gate G4 logic-combines the inverted signal with an inverted signal SYE of the synchronizing error signal SYE by a second inverter INV2. That is, when the frame synchronizations 135E(HEX) are accurately detected, the output signal of the AND gate G4 as shown in FIG. 6(F) is supplied to a clear terminal CLR of the third shift register SR3 to clear the third shift register SR3.

Further, for the signals provided from each of the fourth to seventh output terminals Q24-Q27 of the second shift register SR2, the correct receipt is recognized in the same way as in the muting signals if the relevant bits of the 16 frames show "1" at least 8 or more times, thereby generating relevant signals.

According to the present invention as described above, sound control signals are detected out of the input signals, a judgement is made as to whether the certain state of relevant bits is maintained over the predetermined number of times in a plurality of frames, and then, an occurrence of error is checked so that the precise decoding operation can be carried out.

What is claimed is:

1. A sound signal detecting circuit in a decoder for detecting pulse code modulated sound signals having a plurality of control bits in each frame, comprising:

detecting means coupled to receive said pulse code modulated sound signals, for detecting said plurality of control bits by shifting said pulse code modulated sound signals in accordance with a plurality of clock signals for a predetermined time period to provide detected pulse code modulated sound signals; and majority logic deciding means coupled to receive said detected pulse code modulated sound signals, for inspecting logic states of said plurality of control bits of said detected pulse code modulated sound signals for a predetermined number of times to verify a mode bit, first and second television sound bits, first and second extra sound bits, and undefined bits of said plurality of control bits of said detected pulse code modulated sound signals.

2. The sound control signal detecting circuit as claimed in claim 1, wherein said detecting means comprises:

a first shift register having a plurality of output terminals, coupled to receive said pulse code modulated sound signals, for successively shifting said pulse code modulated sound signals in accordance with a first clock signal to provide a first shifted output signal and a last shifted output signal;

a second shift register for successively shifting said last shifted output signal from said first shift register in accordance with said first clock signal to provide said plurality of control bits of said detected pulse code modulated sound signals; and means for controlling said first and second shift registers by generating said first clock signal in dependence upon reception of a plurality of clock signals having different clock frequencies.

3. The sound control signal detecting circuit as claimed in claim 2, wherein said majority logic deciding means comprises:

period converting means for converting respective control bits of the output signals of said first and second shift registers to periodical forms;

state judging means for providing an output signal representative of whether a logic state of said plurality of control bits is maintained over said predetermined number of times in a same position over a plurality of frames by successively shifting a power source voltage in synchronism with the output signal of said period converting means;

control signal generating means for clearing said state judging means upon detection of an exact frame synchronism with said state judging means; and latch means for providing logic states of said plurality of control bits of said detected pulse code modulated sound signals representative of said mode bit, said first and second television sound bits, and said first and second extra sound bits, after latching the output signal of said state judging means in synchronism with a second clock signal.

4. A signal decoder circuit, comprising:

means for receiving pulse code modulated signals in sequences of frames, wherein each frame has a plurality of synchronizing bits representative of a synchronizing signal, a plurality of data bits, and a plurality of control bits having a first bit control indicative of a sampling mode, second and third control bits indicative of television sound modes, fourth and fifth control bits indicative of extra sound modes, sixth to fifteenth control bits indicative of undefined modes, and a sixteenth control bit indicative of a mute mode;

first detecting means for detecting a synchronizing signal of said pulse code modulated signals;

means for enabling generation of a plurality of clock signals in dependence upon said synchronizing signal;

means for descrambling said pulse code modulated signals in dependence upon said plurality of clock signals to provide descrambled pulse code modulated signals;

second detecting means for detecting said plurality of control bits of each frame of said descrambled pulse code modulated signals;

means for inspecting whether selected bits of said plurality of control bits of each frame of said descrambled pulse code modulated signals remain in same logic states for a selected number of successive frames to provide a plurality of inspected bits to be displayed on a screen, said plurality of inspected bits having said first inspected bit indicative of said sampling mode, said second and third inspected bits indicative of said television sound modes, said fourth and fifth inspected bits indicative of said extra sound modes, said sixth to fifteenth inspected bits indicative of said undefined modes, and sixteenth inspected bit indicative of said mute mode;

third detecting means for detecting errors in said descrambled pulse code modulated signals and correcting the detected errors in said descrambled pulse code modulated signals to provide corrected pulse code modulated signals; and means for interpolating and sampling said corrected pulse code modulated signals in dependence upon said sampling mode of said first inspected bit of said plurality of inspected bits to provide decoded pulse code modulated signals.

5. The signal decoder circuit as claimed in claim 4, wherein said second detecting means comprises:

means for enabling generation of a first clock signal in dependence upon reception of said plurality of clock signals;

first shift register means coupled to receive said descrambled pulse code modulated signals, for successively shifting said plurality of control bits of each frame of said descrambled pulse code modulated signals in synchronism with said first clock signal to provide a first shifted bit representative of said sixteenth control bit of said plurality of control bits and a second shifted bit; and second shift register means coupled to receive said second shifted bit, for successively shifting said second shifted signal in synchronism with said first clock signal to provide a plurality of shifted bits representative of said first, second, third, fourth and fifth control bits of said plurality of control bits.

6. The signal decoder circuit as claimed in claim 5, wherein said inspecting means comprises:

counter means coupled to receive a power source voltage, for enabling generation of a ripple signal at every sixteenth frame of said descrambled pulse code modulated signals in synchronism with a second clock signal;

flip-flop means for enabling transmission of said second clock signal in synchronism with a third clock signal at every $\frac{1}{4}$ of a frame to provide an output clock signal;

first gate means for logically combining said ripple signal and said output clock signal to provide a first gating signal;

means for providing a clear pulse in dependence upon reception of said first gating signal and a synchronizing error signal;

second gate means for logically combining said first shifted bit representative of said sixteenth bit of said plurality of control bits and said second clock signal to provide a second gating signal;

means for checking a logic state of said first shifted bit for said selected number of successive frames to provide said sixteenth inspected bit indicative of said mute mode in dependence upon said first gating signal and said clear pulse; and means for latching said plurality of shifted bits representative of said first, second, third, fourth and fifth control bits of said plurality of control bits in dependence upon said first gating signal and said clear pulse to provide said plurality of inspected bits to be displayed on the screen.

7. The signal decoder circuit as claimed in claim 4, wherein said sampling mode of said first inspected bit enables the sampling of said corrected pulse code modulated signals by one of a first sampling frequency of 32 KHz and a second sampling frequency of 48 KHz.

8. A method for decoding pulse code modulated signals in sequences of frames, wherein each frame of said pulse code modulated signals has a plurality of synchronizing bits representative of a synchronizing signal, a plurality of data bits, and a plurality of control bits having a first control bit indicative of a sampling mode, second and third control bits indicative of television sound modes, fourth and fifth control bits indicative of extra sound modes, sixth to fifteenth control bits indicative of undefined modes, and a sixteenth control bit indicative of a mute mode, comprising the steps of:

receiving said pulse code modulated signals in sequences of frames;

detecting a synchronizing signal of said pulse code modulated signals;

enabling generation of a plurality of clock signals in dependence upon said synchronizing signal;

descrambling said pulse code modulated signals in dependence upon said plurality of clock signals to provide descrambled pulse code modulated signals;

detecting said plurality of control bits of each frame of said descrambled pulse code modulated signals;

inspecting whether selected bits of said plurality of control bits of each frame of said descrambled pulse code modulated signals retain the same logic states for a selected number of successive frames to provide a plurality of inspected bits to be displayed on a screen, said plurality of inspected bits having said first inspected bit indicative of a sampling mode, said second and third inspected bits indicative of said television sound modes, said fourth and fifth inspected bits indicative of said extra sound modes, sixth to fifteenth inspected bits indicative of said undefined modes, and a sixteenth inspected bit indicative of said mute mode;

detecting errors of said descrambled pulse code modulated signals and correcting the detected errors of said descrambled pulse code modulated signals to provide corrected pulse code modulated signals; and interpolating and sampling said corrected pulse code modulated signals in dependence upon said sampling mode of said first inspected bit of said plurality of inspected bits to provide decoded pulse code modulated signals.

9. A signal decoder circuit, comprising:

means for receiving broadcast signals in sequences of frames, wherein each frame has a plurality of synchronizing bits representative of a synchronizing signal, a plurality of data bits, and a plurality of control bits;

first detecting means for detecting a synchronizing signal of said broadcast signals;

means for enabling generation of a plurality of clock signals in dependence upon said synchronizing signal;

second detecting means for detecting said plurality of control bits of each frame of said broadcast signals;

means for inspecting whether selected bits of said plurality of control bits of each frame of said broadcast signals retain logic states for a selected number of successive frames to provide a plurality of inspected bits to be displayed on a screen, said plurality of inspected bits respectively representative of a sampling mode, a television sound mode, an extra sound mode, undefined modes, and a mute mode; and means for interpolating and sampling said broadcast signals in dependence upon said sampling mode of said plurality of inspected bit to provide decoded broadcast signals.

10. The signal decoder circuit as claimed in claim 9, wherein said second detecting means comprises:

means for enabling generation of a first clock signal in dependence upon reception of said plurality of clock signals;

first shift register means coupled to receive said broadcast signals, for successively shifting said plurality of control bits of each frame of said broadcast signals in synchronism with said first clock signal to provide a first shifted bit having a logic state indicative of said mute mode, and a second shifted bit; and second shift register means coupled to receive said second shifted bit, for successively shifting said second shifted signal in synchronism with said first clock signal to provide a plurality of shifted bits respectively representative of said sampling mode, said television sound mode, said extra sound mode, and said undefined modes.

11. The signal decoder circuit as claimed in claim 9, wherein said inspecting means comprises:

counter means coupled to receive a power source voltage, for enabling generation of a ripple signal at every sixteenth frames of said broadcast signals in synchronism with a second clock signal;

logic means for enabling transmission of said second clock signal in synchronism with a third clock signal at every ¼ of a frame to provide an output clock signal;

first gate means for logically combining said ripple signal and said output clock signal to provide a first gating signal;

means for providing a clear pulse in dependence upon reception of said first gating signal and a synchronizing error signal;

second gate means for logically combining said first shifted bit representative of said sixteenth bit of said plurality of control bits and said second clock signal to provide a second gating signal;

means for checking a logic state of said first shifted bit for said selected number of successive frames to provide an inspected bit indicative of said mute mode in dependence upon said first gating signal and said clear pulse; and means for latching said plurality of shifted bits respectively representative of said sampling mode, said television sound mode, an said extra sound mode in dependence upon said first gating signal and said clear pulse to provide said plurality of inspected bits to be displayed on the screen.

12. The signal decoder circuit as claimed in claim 9, wherein said sampling mode of said first inspected bit enables the sampling of said broadcast signals by one of a first sampling frequency of 32 KHz and a second sampling frequency of 48 KHz.

13. A signal decoder circuit, comprising:

means for receiving broadcast signals in sequences of frames, wherein each frame has synchronizing bits, a plurality of data bits, and a plurality of control bits;

means for detecting said plurality of control bits for each frame of said broadcast signals;

means for inspecting whether selected bits of said plurality of control bits of each frame of said broadcast signals retain logic states for a selected number of successive frames to provide a plurality of inspected bits to be displayed on a screen, said plurality of inspected bits respectively representative of a sampling mode, a television sound mode, an extra sound mode, unassigned modes, and a mute mode; and means for interpolating and sampling said broadcast signals in dependence upon said sampling mode of said plurality of inspected bits to provide decoded broadcast signals.

14. The signal decoder circuit as claimed in claim 13, further comprised of said plurality of control bits comprising a first bit indicative of a sampling mode, second and third bits indicative of television sound modes, fourth and fifth bits indicative of an extra sound mode, a plurality of bits indicative of unassigned modes, and a an additional bit indicative of a mute mode.

15. The signal decoder circuit as claimed in claim 13, wherein said detecting means comprises:

means for enabling generation of a first clock signal;

first shift register means coupled to receive said broadcast signals, for successively shifting said plurality of control bits of each frame of said broadcast signals in synchronism with said first clock signal to provide a first shifted bit having a logic state indicative of said mute indicative of said mute mode, and a second shifted bit; and second shift register means coupled to receive said second shifted bit, for successively shifting said second shifted signal in synchronism with said first clock signal to provide a plurality of shifted bits respectively representative of said sampling mode, said television sound mode, said extra sound mode, and said unassigned modes.

16. The signal decoder circuit as claimed in claim 15, wherein said inspecting means comprises:

counter means coupled to receive a power source voltage, for enabling generation of a ripple signal at every sixteenth frame of said broadcast signals in synchronism with a second clock signal;

logic means for enabling transmission of said second clock signal in synchronism with a third clock signal at every one-quarter of a frame to provide an output clock signal;

first gate means for logically combining said ripple signal and said output clock signal to provide a first gating signal;

means for providing a clear pulse in dependence upon reception of said first gating signal and a synchronizing error signal;

second gate means for logically combining a first shifted bit representative of a sixteenth bit of said plurality of control bits and said second clock signal to provide a second gating signal;

means for checking a logic state of said first shifted bit for said selected number of successive frames to provide an inspected bit indicative of said mute mode in dependence upon said first gating signal and said clear pulse; and means for latching a plurality of shifted bits respectively representative of said sampling mode, said television sound mode, and said extra sound mode in dependence upon said first gating signal and said clear pulse to provide said plurality of inspected bits to be displayed on the screen.

17. The signal decoder circuit as claimed in claim 15, wherein said sampling mode of said first inspected bit enables the sampling of said broadcast signals by one of a first sampling frequency of 32 KHz and a second sampling frequency of 48 KHz.

18. The signal decoder circuit as claimed in claim 14, wherein said detecting means comprises:

means for enabling generation of a first clock signal;

first shift register means coupled to receive said broadcast signals, for successively shifting said plurality of control bits of each frame of said broadcast signals in synchronism with said first clock signal to provide one shifted bit having a logic state indicative of said mute mode, and next shifted bit; and second shift register means coupled to receive said next shifted bit, for successively shifting said next shifted signal in synchronism with said first clock signal to provide a plurality of shifted bits respectively representative of said sampling mode, said television sound mode, said extra sound mode, and said unassigned modes.

19. The signal decoder circuit as claimed in claim 18, wherein said inspecting means comprises:

counter means coupled to receive a power source voltage, for enabling generation of a ripple signal at every sixteenth frame of said broadcast signals in synchronism with a second clock signal;

logic means for enabling transmission of said second clock signal in synchronism with a third clock signal at every one-quarter of a frame to provide an output clock signal;

first gate means for logically combining said ripple signal and said output clock signal to provide a first gating signal;

means for providing a clear pulse in dependence upon reception of said first gating signal and a synchronizing error signal;

second gate means for logically combining a first shifted bit representative of a sixteenth bit of said plurality of control bits and said second clock signal to provide a second gating signal;

means for checking a logic state of said first shifted bit for said selected number of successive frames to provide an inspected bit indicative of said mute mode in dependence upon said first gating signal and said clear pulse; and means for latching a plurality of shifted bits respectively representative of said sampling mode, said television sound mode, and said extra sound mode in dependence upon said first gating signal and said clear pulse to provide said plurality of inspected bits to be displayed on the screen.

20. The signal decoder circuit as claimed in claim 18, wherein said sampling mode of said first inspected bit enables the sampling of said broadcast signals by one of a first sampling frequency of 32 KHz and a second sampling frequency of 48 KHz.

* * * * *